United States Patent
Kruglick et al.

(10) Patent No.: US 8,734,924 B2
(45) Date of Patent: May 27, 2014

(54) LAMINATE STRUCTURE COMPRISING A LIPOPHILIC GEL FOR CONTAINING ELECTROLYTE LEAKS

(75) Inventors: Ezekiel Kruglick, Poway, CA (US); Seth Miller, Engelwood, CO (US)

(73) Assignee: Empire Technology Development LLC, Wilmington, DE (US)

( * ) Notice: Subject to any disclaimer, the term of this patent is extended or adjusted under 35 U.S.C. 154(b) by 553 days.

(21) Appl. No.: 12/999,978

(22) PCT Filed: Oct. 1, 2010

(86) PCT No.: PCT/US2010/051064
§ 371 (c)(1),
(2), (4) Date: Dec. 17, 2010

(87) PCT Pub. No.: WO2012/044323
PCT Pub. Date: Apr. 5, 2012

(65) Prior Publication Data
US 2012/0082889 A1    Apr. 5, 2012

(51) Int. Cl.
*C09K 3/12*    (2006.01)
*H01M 2/08*    (2006.01)

(52) U.S. Cl.
USPC ............... 428/35.7; 220/560.01; 220/560.02

(58) Field of Classification Search
CPC . H01M 2/08; H01M 10/4235; H01M 2/1094; C09K 3/12
USPC ................ 428/35.7; 220/560.01, 560.02
See application file for complete search history.

(56) References Cited

U.S. PATENT DOCUMENTS

| | | |
|---|---|---|
| 2,424,701 A | 7/1947 | Merrill |
| 2,500,158 A | 3/1950 | Dickie et al. |
| 3,664,904 A | 5/1972 | Cook |
| 2010/0206784 A1 | 8/2010 | Weaver et al. |

FOREIGN PATENT DOCUMENTS

WO    9014222 A1    11/1990

OTHER PUBLICATIONS

Toshikazu Ono, et al., Lipophilic polyelectrolyte gels as super-absorbent polymers for nonpolar organic solvents, Nature Materials, vol. 6, Apr. 29, 2007.
Micah Ortuzar, et al., Report on Fire Event Originated by Ultracapacitors in an Experimental Electric Vehicle, IEEE Vehicular Propulsion, VPP-2004, Oct. 6-8, 2004, Paris, France.
Stephanie Jousset, et al., Polyelectrolytes of High Charge Density in Organic Solvents. Synthesis and Viscosimetric Behavior, American Chemical Society, Macromolecules 1998, vol. 31, 4520-4530, Jun. 17, 1998.
"Sodium polyacrylate," accessed at http://en.wikipedia.org/wiki/Sodium_polyacrylate last modified on Apr. 7, 2012, pp. 2.
International Search Report for International Application No. PCT/US2010/051064, European Patent Office, The Hague, Netherlands, mailed on Nov. 4, 2010.

*Primary Examiner* — Michele L Jacobson

(57) ABSTRACT

Implementations and techniques for containing electrolyte leaks are generally disclosed.

10 Claims, 3 Drawing Sheets

LAMINATE STRUCTURE COMPRISING A LIPOPHILIC GEL FOR CONTAINING ELECTROLYTE LEAKS

BACKGROUND

Unless otherwise indicated herein, the approaches described in this section are not prior art to the claims in this application and are not admitted to be prior art by inclusion in this section.

Ultracapacitors may be useful in a variety of applications, such as, for example, electric and hybrid vehicles. Ultracapacitors may contain and may be at risk of leaking electrolyte. Some electrolytes may be a significant fire hazard. Even in cases where the type or amount of leaked electrolyte does not cause a safety hazard, the leaks may cause undesirable parasitic current paths that may drain power and cause other performance problems.

SUMMARY

In accordance with some implementations, self-sealing containers may include an inner wall, an outer wall surrounding the inner wall and, between the inner wall and the outer wall, a sealing layer that includes a lipophilic gel configured to expand and provide a seal if contacted by an electrolyte.

In accordance with some implementations, self-sealing membranes may include a backing layer and, affixed to the backing layer, an absorbent layer that includes a lipophilic gel embedded in a membrane and configured to expand when contacted by a polar hydrocarbon electrolyte.

In accordance with some implementations, methods for forming self-sealing membranes may include pressing a lipophilic gel configured to absorb a polar hydrocarbon electrolyte into a membrane and affixing the membrane to a backing membrane.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
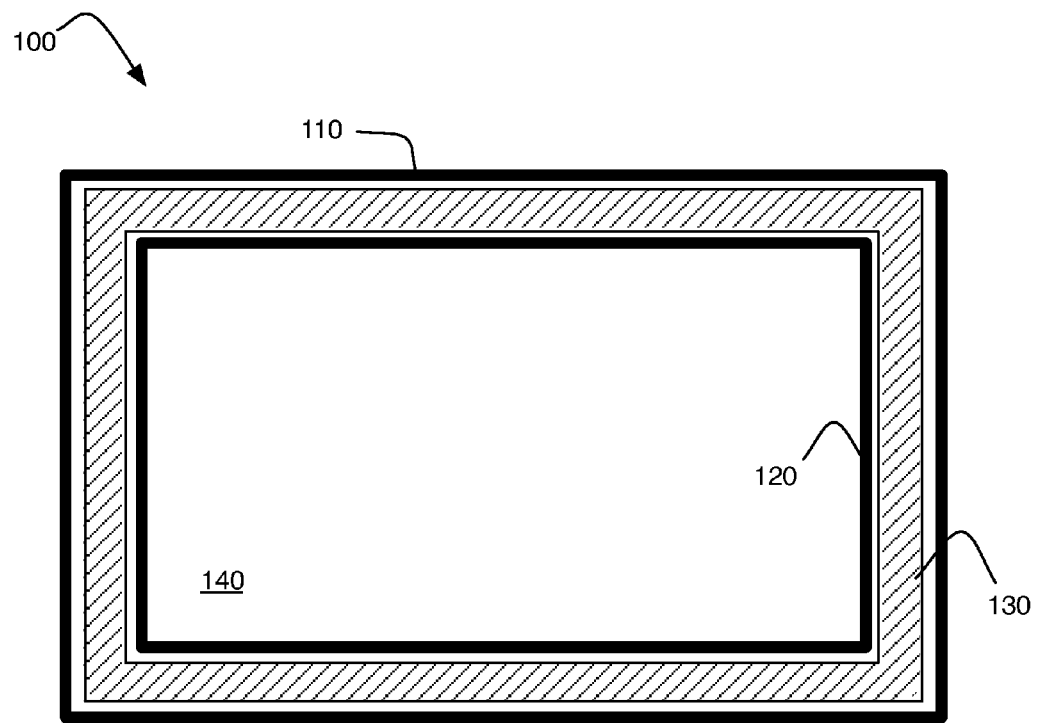
FIG. 1 is an illustration of an example apparatus for containing electrolyte leaks.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatuses and systems related to containing electrolyte leaks.

It may be desirable to contain electrolyte leaks in, for example, ultracapacitor applications. Leaked electrolytes may be flammable and may cause significant fire hazards when leaked. In instances where the type or amount of leaked electrolyte may not cause a fire hazard, a leaked electrolyte may cause other undesirable consequences such as, for example, parasitic current paths that may drain power or cause other performance problems. In general, electrolytes used in ultracapacitor or battery applications may be substantially short and/or substantially polar hydrocarbons.

In some examples, an electrolyte may be contained against potential leaks using a double-walled container with a sealing layer between substantially rigid inner and outer walls. In some examples, the sealing layer may include an absorbent membrane sandwiched between casing membranes. In some examples, the absorbent membrane may include a sheet impregnated with a lipophilic gel. The lipophilic gel may absorb electrolyte when wetted, and may expand when the electrolyte may be absorbed. Such expansion may self-seal against potential leaks, for example, by pressing the casing membranes into the void that may otherwise provide for a leak.

In other examples, electrolyte may be contained against potential leaks using a wrap or casing that may include an absorbent membrane affixed to a backing layer. The absorbent membrane may include a sheet impregnated with a lipophilic gel. As discussed, the lipophilic gel may absorb electrolyte when wetted, and expand when the electrolyte may be absorbed. In some examples, the absorption may be sufficient to contain the potential leak. In other examples, the wrap may be tightly bound around a potential leak point (i.e., a seal, junction or fitting) and the expansion may cause the wrap to tighten against the leak point, which may further contain the potential leak.

FIG. 1 is an illustration of an example apparatus 100 that may be configured to contain electrolyte leaks, arranged in accordance with at least some embodiments described herein. Apparatus 100 may include an outer wall 110, an inner wall 120 and a sealing layer 130 that may contain void 140. As shown, in some examples, outer wall 110 may substantially surround inner wall 120 and sealing layer 130 may be substantially between inner wall 120 and outer wall 110. Void 140 may be configured to contain or house a device or devices that may include an electrolyte. In some examples, the device or devices may include one or more ultracapacitors, an ultracapacitor bank, one or more batteries, or a battery bank. As illustrated, in some examples, void 140 may be fully housed or enclosed by inner wall 120 and/or outer wall 130. In other examples, apparatus 100 may also include an access port or ports or a lid or panel, or the like for accessing void 140, which are not shown for the sake of clarity of presentation.

Figure 2:
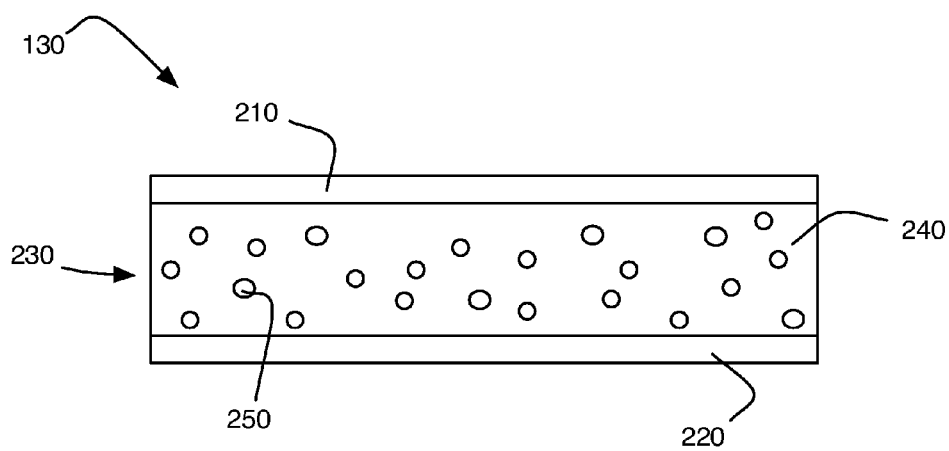
FIG. 2 is an illustration of an example sealing layer for containing electrolyte leaks.

FIG. 2 is an illustration of an example sealing layer configured to contain electrolyte leaks, arranged in accordance with at least some embodiments described herein. Sealing layer 130 may include casing membranes 210, 220 and absorbent membrane 230. Absorbent membrane 230 may include a sheet 240 impregnated with lipophilic gel 250. Casing membranes 210, 220 may include any suitable materials that provide a substantially pliant layer. In some examples, casing membranes 210, 220 may include a rubber or plastic material. In some examples, casing membranes 210, 220 may be the same material. In other examples, they may be different materials. Sheet 240 may include any suitable material or materials that may provide a substrate for a lipophilic gel. In some examples, sheet 240 may include a pliant material suitable for impregnation with a lipophilic gel such as, for example, cotton or paper.

In some examples, lipophilic gel 250 may include a material that may absorb an electrolyte when wetted, and expand upon absorption of the electrolyte. Lipophilic gel 250 may include any lipophilic gel suitable to absorb an electrolyte. In some examples, the electrolyte may include a polar volatile organic and the lipophilic gel may include any lipophilic gel suitable for absorbing a polar volatile organic electrolyte. In some examples, the electrolyte may include acetonitrile and the lipophilic gel may include any lipophilic gel suitable for absorbing acetonitrile. In various examples, lipophilic gel 250 may include a lipophilic polymer gel, a lipophilic polyelectrolyte gel, polymerized poly(octadecyl acrylate), or a Jousset-style polar specific absorber, or any combination thereof.

In some instances, a portion or portions of apparatus 100 may be at risk of a puncture or other damage. In some examples, apparatus 100 may be utilized in a vehicle and it may be at risk of a puncture during an accident and therefore there may be at risk of leaking electrolyte. In some examples, a portion or portions of apparatus 100 may be at risk of a leak point such as, for example, at a loose fitting, a failed joint, or the like. In such instances, apparatus 100 may contain a potential leak through absorption of some or all of the electrolyte at sealing layer 130. In some examples, lipophilic gel 250 may absorb some or all of the potential leak. In other examples, lipophilic gel 250 may absorb some or all of the potential leak and expand upon the absorption, which may further contain the potential leak. In some examples, the expansion may cause the gel to grow to twice its original size, or more. In some examples, the expansion may cause sealing layer 130 to expand and to tightly fit between inner wall 120 and outer wall 110. Such a tight fight may provide a seal that may contain the potential leak. In some examples, sealing layer 130 may expand into the potential cause of a leak such as, for example, a hole, a puncture, a slit, a tear, or the like, to provide a seal that contains the potential leak.

As shown, in some examples, sealing layer 130 may include an absorbent membrane sandwiched between two casing membranes. In some examples, a single casing membrane may be used. In other examples, no casing membranes may be used. In some examples, a stack of absorbent membranes may be used. The stacked absorbent membranes may include the same lipophilic gels or they may include different lipophilic gels. In some examples, the stacked absorbent membranes may be interspersed between a stack of casing membranes.

In some examples, sealing layer 130 may swell upon wetting by an electrolyte such that it may seal against a potential leak. Therefore, in some examples, the sealing layer may be considered a self-sealing layer. In some examples, the sealing layer may substantially fill the space between the walls of apparatus 100. In other examples, the sealing layer may fit loosely between the walls of apparatus 100 such that, upon a leak and wetting by electrolyte, the swelling gel may maneuver in the openings to contain the potential leak. Sealing layer 130 may be any suitable thickness to contain electrolyte leaks. In some examples, the sealing layer may be about 0.1 to 1 millimeters thick. In some examples, the sealing layer may be about 1 to 3 millimeters thick. In some examples, the sealing layer may be about 3 to 10 millimeters thick.

In some examples, apparatus 100 may include a metal foil seal or seals between inner wall 120 and outer wall 110. In various examples, sealing layer 130 may be under or outside a metal foil seal. In other examples, a metal foil seal may be incorporated with sealing layer 130 such that either or both of casing membranes 210, 220 may be affixed to a metal foil.

Inner wall 120 and outer wall 110 may include any suitable material for containing the devices stored therein. In some examples, outer wall 110 and inner wall 120 may include a high density plastic. In other examples, outer wall 110 and inner wall 120 may include aluminum or other suitable metal. In some examples, the inner wall and the outer wall may be the same material. In other examples, they may be different materials. As discussed, apparatus 100 may include an access port or ports or a lid or panel, or the like, such that void 140 may be accessed. In such examples, the ports or seams in openings or the like may be secured against potential leaks by a tape or wrap or the like, which is discussed further herein.

Figure 3:
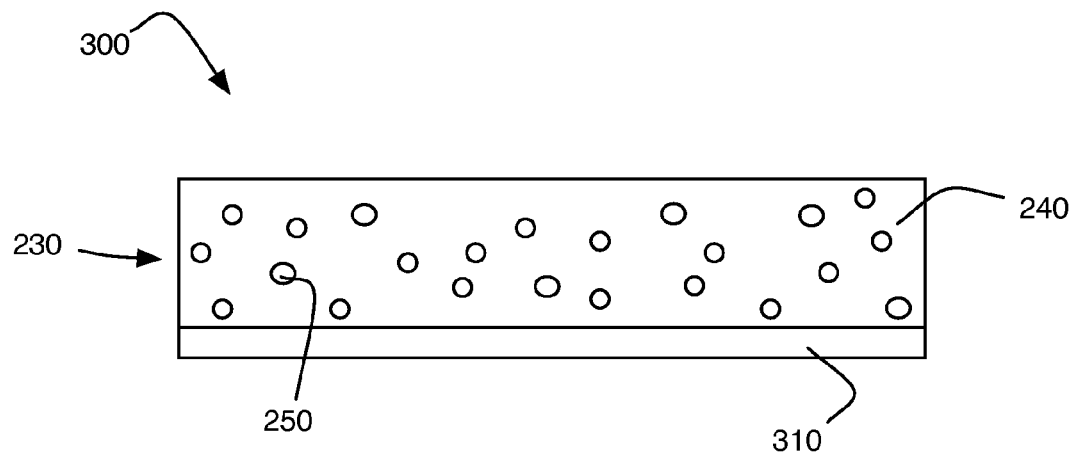
FIG. 3 is an illustration of an example apparatus for containing electrolyte leaks.

FIG. 3 illustrates an example apparatus 300 configured to contain electrolyte leaks, arranged in accordance with at least some embodiments described herein. Apparatus 300 may include a backing layer 310 and absorbent membrane 230. As discussed, absorbent membrane 230 may include sheet 240 impregnated with lipophilic gel 250. In some examples, backing layer 310 may be a pliant material such as, for example, a rubber or plastic material. As discussed, in some examples, sheet 240 may include a pliant material suitable for impregnation with a lipophilic gel such as, for example, cotton or paper. In some examples, lipophilic gel 250 may include a material that may absorb an electrolyte when wetted, and expand upon absorption. Lipophilic gel 250 may include any lipophilic gel suitable to absorb an electrolyte. In some examples, lipophilic gel 250 may include a material that may absorb an electrolyte when wetted, and expand upon absorption. In various examples, lipophilic gel 250 may include a lipophilic polymer gel, a lipophilic polyelectrolyte gel, polymerized poly(octadecyl acrylate), or a Jousset-style polar specific absorber, or any combination thereof.

In some examples, apparatus 300 may be implemented as a wrap, tape or adhesive tape. In some examples, the wrap may be tightly wound around locations that may be susceptible to leaks, such as, for example, seals, piping junctions or fittings. In some examples, the tape or wrap may include an adhesive to facilitate application to various components. In some examples, the adhesive may be applied to backing layer 310. In some examples, the adhesive may be applied to absorbent membrane 230. As a tape or wrap, apparatus 300 may have any suitable dimensions. The thickness of absorbent membrane may include any of the thicknesses discussed above with respect to FIG. 2. The width of the tape or wrap may be any suitable width for the particular application. In some examples, the width may be in the range of about 0.5 centimeters to about 30 centimeters.

As discussed, in some examples, apparatus 300 may be implemented as a tape or wrap. In general, apparatus 300 may be formed in any suitable shape. In some examples, apparatus 300 may be implemented as a ring or a gasket for pipe fittings. In some examples, apparatus 300 may be implemented as a bag or other shape that may contain a particular component, fitting, casing, volume or environment or the like.

As shown, in some examples apparatus 300 may include a backing layer and an absorbent membrane. In other examples, a stack of absorbent membranes may be used either with the same lipophilic gels or with different lipophilic gels. In some examples, a casing layer may be provided opposite backing layer 310, similar to the example shown in FIG. 2. In some examples, the casing layer may include an adhesive layer. In some examples, a second absorbent membrane may be provided on the side of backing layer 310 opposite absorbent membrane 230. In such examples, the second absorbent membrane may include the same lipophilic gel as absorbent membrane 230 or they may be different. Backing layer 310 may include any suitable materials that provide a substantially pliant layer. In some examples, backing layer 310 may include a rubber or plastic material.

Figure 4:
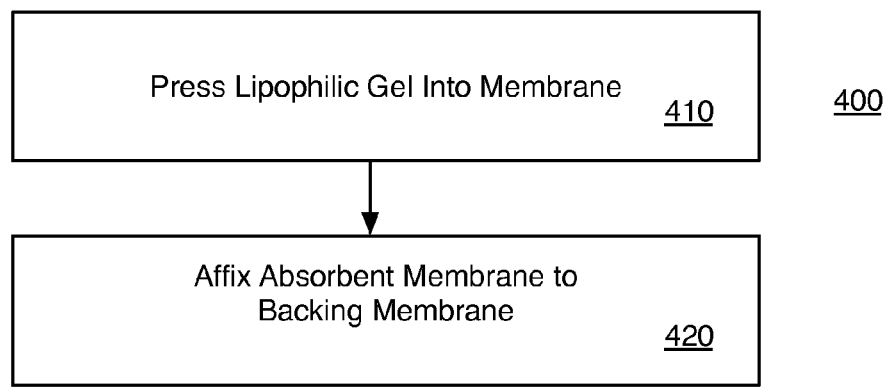
FIG. 4 is an illustration of a flow chart of an example method for producing an electrolyte sealing layer.

FIG. 4 is an illustration of a flow chart of an example method 400 for producing an electrolyte sealing layer. Method 400 may include one or more functions, operations or actions as illustrated by one or more of blocks 410 and/or 420. In some examples, method 400 may be implemented under the control of a computer system, as is discussed further herein. Processing for method 400 may begin at block 410.

At block 410, "Press Lipophilic Gel Into Membrane", a lipophilic gel may be pressed into a membrane. The membrane may be provided or attained, for example, and, in some examples, the membrane may be fed between reels for processing such that the lipophilic gel is pressed into the membrane between two rollers. In an example, lipophilic gel 250 may be pressed into sheet 240. In some examples, a dry lipophilic gel may be pressed into the sheet. In other examples, the lipophilic gel may be pressed into the sheet while in a non-absorbing solvent. In some examples, the lipophilic gel may be sprayed onto the membrane while in a non-absorbing solvent and pressed into the sheet using rollers, or the like. Processing may continue at block 420.

At block 420, "Affix Absorbent Membrane to Backing Membrane", the absorbent membrane may be affixed to a backing membrane or layer. In an example, absorbent membrane 230 may be affixed to backing layer 310. In some examples, the absorbent membrane may be affixed to the backing membrane or layer using an adhesive. In some examples, the absorbent membrane and backing membrane may be brought into contact with an adhesive between them and pressure may be applied, by rollers for example, to affix the membranes. As illustrated, in some examples, the lipophilic gel may be pressed into a membrane and the membrane may be affixed to a backing layer. In other examples, the membrane may be affixed to a backing layer and then the lipophilic gel may be pressed, as discussed above, into the membrane.

Figure 5:
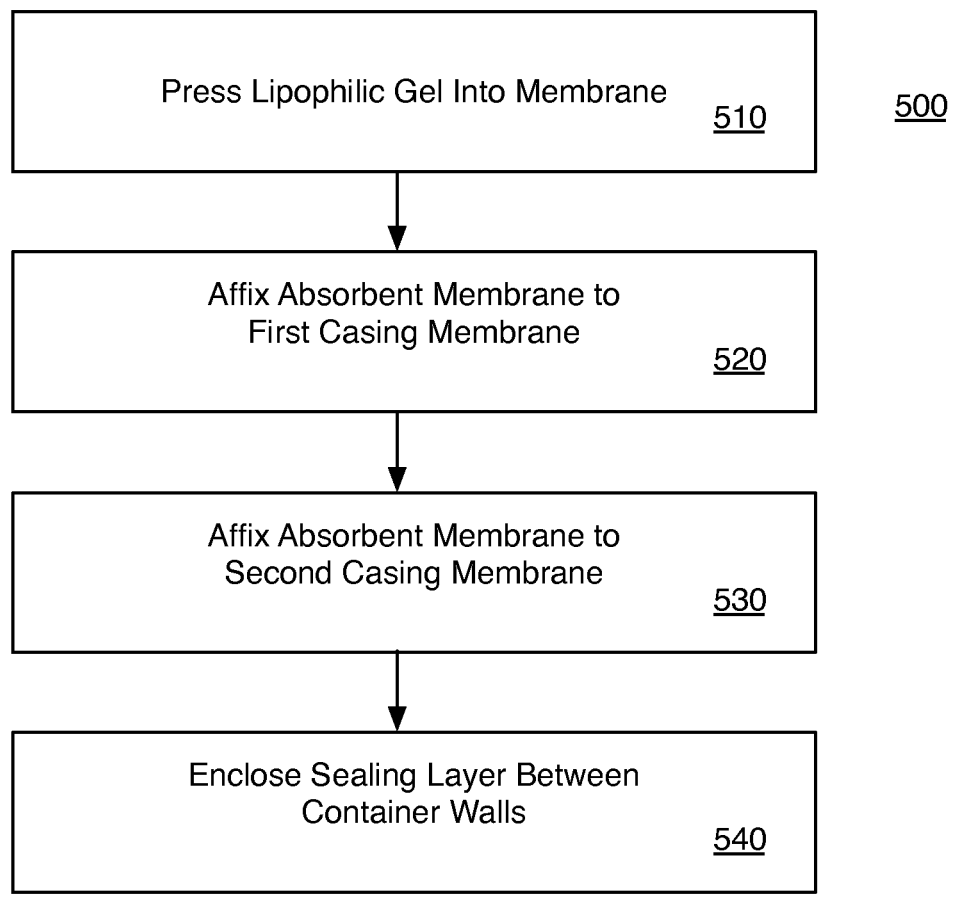
FIG. 5 is an illustration of a flow chart of an example method for producing an electrolyte containing apparatus.

FIG. 5 is an illustration of a flow chart of an example method 500 for producing an electrolyte sealing apparatus. Method 500 may include one or more functions, operations or actions as illustrated by one or more of blocks 510, 520, 530, and/or 540. In some examples, method 500 may be implemented under the control of a computer system, as is discussed further herein. Processing for method 500 may begin at block 510.

At block 510, "Press Lipophilic Gel Into Membrane", a lipophilic gel may be pressed into a membrane. The membrane may be provided or attained, for example, and, in some examples, the membrane may be fed between reels for processing such that the lipophilic gel is pressed into the membrane between two rollers. In an example, lipophilic gel 250 may be pressed into sheet 240. In some examples, a dry lipophilic gel may be pressed into the sheet. In other examples, the lipophilic gel may be pressed into the sheet while in a non-absorbing solvent. In some examples, the lipophilic gel may be sprayed onto the membrane while in a non-absorbing solvent and pressed into the sheet using rollers or the like. Processing may continue at block 520.

At block 520, "Affix Absorbent Membrane to Casing Membrane", the absorbent membrane may be affixed to a backing membrane or layer. In an example, absorbent membrane 230 may be affixed to casing membrane 210. In some examples, the absorbent membrane may be affixed to the casing membrane or layer using an adhesive. In some examples, the absorbent membrane and casing membrane may be brought into contact with an adhesive between them and pressure may be applied, by rollers for example, to affix the membranes. As illustrated, in some examples, the lipophilic gel may be pressed into a membrane and the membrane may be affixed to a casing layer. In other examples, the membrane may be affixed to a casing layer and then the lipophilic gel may be pressed, as discussed above, into the membrane. Processing may continue at block 530.

At block 530, "Affix Absorbent Membrane to Second Casing Membrane", the absorbent membrane may be affixed to a backing membrane or layer to form a sealing layer. In an example, absorbent membrane 230 may be affixed to casing membrane 220 to form sealing layer 130. In some examples, the absorbent membrane may be affixed to the backing membrane or layer using an adhesive. In some examples, the absorbent membrane and backing membrane may be brought into contact with an adhesive between them and pressure may be applied, by rollers for example, to affix the membranes. Processing may continue at block 540.

At block 540, "Enclose Sealing Layer Between Container Walls", the sealing layer may be enclosed between container walls to form a self-sealing apparatus. In an example, sealing layer 130 may be enclosed between inner wall 120 and outer wall 130 to form apparatus 100.

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A self-sealing container comprising:
    an inner wall;
    an outer wall substantially surrounding the inner wall; and
    a sealing layer substantially between the inner wall and the outer wall, wherein the sealing layer comprises an absorbent layer including:
        a first lipophilic gel configured to expand and provide a seal upon contact with a polar hydrocarbon electrolyte; and
        a second lipophilic gel configured to expand and provide a seal upon contact with a polar hydrocarbon electrolyte, wherein the first lipophilic gel is different from the second lipophilic gel.

2. The self-sealing container of claim 1, wherein the sealing layer comprises the absorbent layer disposed substantially between a first casing membrane and a second casing membrane, and wherein the first lipophilic gel is impregnated on a first pliable sheet.

3. The self-sealing container of claim 2, wherein the second lipophilic gel is impregnated on a second pliable sheet.

4. The self-sealing container of claim 1, wherein the first lipophilic gel comprises at least one of a lipophilic polymer gel, a lipophilic polyelectrolyte gel, polymerized poly(octadecyl acrylate), or a polar specific absorber.

5. The self-sealing container of claim 1, wherein the inner wall comprises at least one of aluminum or a plastic.

6. The self-sealing container of claim 1, wherein the self-sealing container is configured to contain at least one of an ultracapacitor or a battery and wherein the polar hydrocarbon electrolyte comprises at least one of a polar volatile organic electrolyte or acetonitrile 7. The self-sealing container of claim 1, wherein the first lipophilic layer gel is affixed to a first side of a backing layer.

8. The self-sealing container of claim 7, wherein the second lipophilic gel is affixed to a second side of the backing layer.

9. The self-sealing container of claim 7, further comprising: an adhesive affixed to the backing layer.

10. The self sealing container of claim 7, wherein the first lipophilic gel is substantially embedded in a membrane comprising at least one of cotton or paper.

* * * * *

UNITED STATES PATENT AND TRADEMARK OFFICE
CERTIFICATE OF CORRECTION

PATENT NO. : 8,734,924 B2  
APPLICATION NO. : 12/999978  
DATED : May 27, 2014  
INVENTOR(S) : Kruglick et al.

Page 1 of 1

It is certified that error appears in the above-identified patent and that said Letters Patent is hereby corrected as shown below:

On the Title Page, item (75), under "Inventors", in Column 1, Line 2, delete "Engelwood," and insert -- Englewood, --, therefor.

In the Specification

In Column 3, Line 2, delete "outer wall 130." and insert -- outer wall 110. --, therefor.

In Column 6, Lines 41-42, delete "outer wall 130" and insert -- outer wall 110 --, therefor.

In the Claims

In Column 8, Line 45, in Claim 6, delete "acetonitrile" and insert -- acetonitrile. --, therefor.

In Column 8, Line 52, in Claim 10, delete "self sealing" and insert -- self-sealing --, therefor.

Signed and Sealed this  
Twenty-first Day of October, 2014

Michelle K. Lee  
*Deputy Director of the United States Patent and Trademark Office*